US010912181B2

(12) United States Patent
Gebert

(10) Patent No.: US 10,912,181 B2
(45) Date of Patent: Feb. 2, 2021

(54) METHOD FOR DETECTING HIGH-VOLTAGE FLASHOVERS IN X-RAY EQUIPMENT AND X-RAY EQUIPMENT

(71) Applicant: Siemens Healthcare GmbH, Erlangen (DE)

(72) Inventor: Bernhard Gebert, Hagenau (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 104 days.

(21) Appl. No.: 15/912,736

(22) Filed: Mar. 6, 2018

(65) Prior Publication Data

US 2018/0263100 A1 Sep. 13, 2018

(30) Foreign Application Priority Data

Mar. 8, 2017 (DE) ........................ 10 2017 203 830

(51) Int. Cl.
*H05G 1/26* (2006.01)
*H05G 1/54* (2006.01)
(Continued)

(52) U.S. Cl.
CPC ........... *H05G 1/265* (2013.01); *H01J 35/165* (2013.01); *H05G 1/10* (2013.01); *H05G 1/54* (2013.01); *H05G 1/04* (2013.01)

(58) Field of Classification Search
CPC ............ H05G 1/04; H05G 1/10; H05G 1/265; H05G 1/54; H05G 1/025; H05G 1/08;
(Continued)

(56) References Cited

U.S. PATENT DOCUMENTS 4,768,215 A 8/1988 Kiwaki et al.
5,055,828 A 10/1991 Konigstein et al.
(Continued)

FOREIGN PATENT DOCUMENTS

CN 1063988 A 8/1992
CN 1572254 A 2/2005
(Continued)

OTHER PUBLICATIONS

Morneburg Hrsg.: "Bildgebende Systeme für die medizinische Diagnostik", Publicis MCD Verlag, 1995, 3. Edition, Kapital 8.1.1, pp. 230-249.

(Continued)

*Primary Examiner* — Marcus H Taningco
(74) *Attorney, Agent, or Firm* — Harness, Dickey & Pierce, P.L.C.

(57) ABSTRACT

A method is for detecting high-voltage flashovers in X-ray equipment including an X-ray emitter and a high-voltage supply. The X-ray emitter has an X-ray tube, surrounded by an insulating medium; and the high-voltage supply has a high-voltage generator and a cable. The cable is at least part of a connecting passage between the high-voltage generator and the X-ray tube. During normal operation of the X-ray equipment, an interference pulse, which occurs due to the high-voltage flashover in the connecting passage, is detected and evaluated with the aid of a measuring device, including a measuring element. As such, an assessment of the condition of the X-ray emitter and of other high voltage-carrying components, and measures that follow, are made using the evaluated interference pulse.

25 Claims, 3 Drawing Sheets

(51) Int. Cl.
*H01J 35/16* (2006.01)
*H05G 1/10* (2006.01)
*H05G 1/04* (2006.01)

(58) Field of Classification Search
CPC ...... H05G 1/085; H01J 35/165; H01J 35/105; H01J 35/106; H01J 35/12; H01J 35/16; G01N 23/04
See application file for complete search history.

(56) References Cited

U.S. PATENT DOCUMENTS

| | | | | |
|---|---|---|---|---|
| 5,132,999 A | 7/1992 | Wirth | | |
| 2004/0258196 A1 | 12/2004 | Lounsberry | | |
| 2007/0189463 A1* | 8/2007 | Deuringer | G01R 31/257 | 378/207 |
| 2007/0247767 A1* | 10/2007 | Zhang | H02H 1/0015 | 361/42 |
| 2009/0212786 A1* | 8/2009 | Brach | G01R 31/086 | 324/525 |
| 2014/0050305 A1* | 2/2014 | Zhao | G01N 23/04 | 378/141 |
| 2015/0137795 A1 | 5/2015 | Wiedmann et al. | | |

FOREIGN PATENT DOCUMENTS

| | | |
|---|---|---|
| CN | 101754561 A | 6/2010 |
| DE | 4243360 C2 | 9/1995 |

OTHER PUBLICATIONS

Morneburg, Heinz Hrsg.: "Bildgebende Systeme für die medizinische Diagnostik", Publicis MCD Verlag, 1995, 3. Auflage, pp. 277-279.
German Office Action. Published Oct. 4, 2017.
Office Action for Chinese Patent Application No. 201810188385.7 dated Mar. 3, 2020 and English translation thereof.
Office Action for Chinese Patent Application No. 201810188385.7 dated Jul. 3, 2020 and English translation thereof.
An, Baoxiang et al. "Automobile Manufacturing: Application of Nondestructive Testing" Beijing Institute of Technology Press; pp. 297-298, 1998 (Sep. 30, 1998).
Office Action for Chinese Patent Application No. 201810188385.7 dated Nov. 4, 2020, and English translation thereof.

* cited by examiner

METHOD FOR DETECTING HIGH-VOLTAGE FLASHOVERS IN X-RAY EQUIPMENT AND X-RAY EQUIPMENT

PRIORITY STATEMENT

The present application hereby claims priority under 35 U.S.C. § 119 to German patent application number DE 102017203830.6 filed Mar. 8, 2017, the entire contents of which are hereby incorporated herein by reference.

FIELD

At least one embodiment of the invention generally relates to a method for detecting high-voltage flashovers in X-ray equipment. At least one embodiment of the invention also generally relates to X-ray equipment.

BACKGROUND

X-ray radiation is generated in an X-ray tube. An applied high voltage accelerates electrons to almost light speed. After the acceleration, these electrons are decelerated preferably to 30% to 70% of their speed. X-ray radiation is generated in the process. The X-ray tube has a cathode as the electron source, as well as an anode.

Additionally, the X-ray tube has a vacuum in which the cathode and the anode are arranged. The vacuum is used for high-voltage insulation. The X-ray tube is arranged inside an X-ray emitter and frequently surrounded by an insulating medium, for example an insulating oil or a solid insulator. The X-ray emitter is also surrounded by an emitter housing. A more detailed construction of an X-ray tube and an X-ray emitter can be found in "Bildgebende Systeme für die medizinische Diagnostik" [Imaging Systems for Medical Diagnosis], Editor: Heinz Morneburg, 3rd edition, 1995, Publicis MCD Verlag, p. 230 ff.

In order to generate X-ray radiation, firstly a current in a range between preferably a few milliamperes to about 6 A and secondly a voltage of a few hundred kilovolts are required. The radiation quality, also called radiation hardness, is determined by the level of the applied voltage and the radiation intensity by the level of the chosen current.

In order to generate the high voltage, a high-voltage generator is provided, which typically has a high frequency generator. The high-voltage generator and the X-ray emitter are often electrically connected by at least one cable, in particular with a single-pole design, or also a plurality of cables, for example two cables, in particular with a two-pole design. The at least one cable is typically a coaxial cable. With the single-pole design the high voltage or a forward and return conduction of an X-ray tube current is conveyed through the one coaxial cable. The two-pole design of the X-ray equipment has one cable respectively as the forward conductor and return conductors of the X-ray tube current. The current load per cable is consequently halved hereby, although this design is also frequently accompanied by an increased space requirement compared to the single-pole design.

DE42 43 360 C2 describes a coaxial cable for electrical connection of the high-voltage generator and the X-ray emitter. With the known coaxial cable, the X-ray tube current is supplied via an inner conductor of the coaxial cable. The X-ray tube current is returned to the high-voltage generator via an outer conductor of the coaxial cable, an inner conductor of a second coaxial cable or via a housing connection. A housing connection is here taken to mean for example a shared ground connection of the housing of the high-voltage generator and the housing of the X-ray emitter.

During operation, the applied high voltage often leads to unintentional high-voltage flashovers inside the X-ray equipment. The high-voltage flashovers can occur at different locations and have different effects.

High-voltage flashovers inside the vacuum of the X-ray tube are largely self-repairing, whereas high-voltage flashovers in the insulating medium can lead to an irreversible change therein and consequently to loss of the desired insulating effect. High-voltage flashovers in the emitter housing also culminate in destruction of the X-ray emitter.

For example, what are known as dummy plugs or dummy jacks can be used in an X-ray emitter for detecting defective components due to high-voltage flashovers. The X-ray emitter is separated from the X-ray equipment and replaced by a dummy jack. If no further high-voltage flashover occurs when operation is resumed, it can be assumed that the flashover was caused by a defective X-ray emitter. The use of dummy jacks or dummy plugs is cost-intensive and results in downtime of the X-ray equipment.

The high-voltage generator conventionally has an integrated electronic device, which is designed for detecting high-voltage flashovers. It is typically used for protecting the high-voltage generator and the X-ray emitter, for example via a short-circuit contactor. Alternatively or additionally, an output voltage is detected on the high-voltage generator.

SUMMARY

Detection typically occurs with the aid of a voltage divider, which frequently has a divider ratio of several kV to a few V, for example of 100 kV to 5V. The inventor has recognized that, due to positioning of this electronic device on the high-voltage generator and insufficiently fast metrology (owing to the voltage divider, for example by a factor of 100), this electronic device alone is inadequate for detecting high-voltage flashovers in the X-ray emitter.

Taking this as a starting point, at least one embodiment of the invention is based a method with the aid of which high-voltage flashovers are detected.

At least one embodiment of the invention is directed to a method for detecting high-voltage flashovers in X-ray equipment. Advantageous embodiments, developments and variants are the subject-matter of the claims.

At least one embodiment of the invention is directed to a method for detecting in X-ray equipment. The X-ray equipment includes an X-ray emitter and a high-voltage supply. The X-ray emitter includes an X-ray tube and the high-voltage supply includes a high-voltage generator and at least one cable. The at least one cable is at least part of a connecting passage between the high-voltage generator and the X-ray tube. In at least one embodiment, the method comprises:

detecting an interference pulse, during normal operation of the X-ray equipment, occurring due to a high-voltage flashover in the connecting passage; and evaluating the interference pulse.

At least one embodiment is also directed to X-ray equipment.

In at least one embodiment, the X-ray equipment has an X-ray emitter and a high-voltage supply. The X-ray emitter also has an X-ray tube and the high-voltage supply a high-voltage generator as well as a cable. The cable is at least part of a connecting passage between the high-voltage generator and the X-ray tube. The connecting passage is taken to mean a line connection between the output of the high-voltage generator and the input of the X-ray tube. The connecting passage therefore encloses a first sub-line between the output of the high-voltage generator and the start of the cable as well as a second sub-line between the input of the X-ray emitter and the input of the X-ray tube.

The advantages stated in respect of the method and example embodiments should logically be transferred to the measuring assembly and vice versa. Preferred developments of the X-ray equipment are provided, moreover, in the claims.

BRIEF DESCRIPTION OF THE DRAWINGS

Example embodiments of the invention will be illustrated in more detail below with reference to the figures. In sometimes highly simplified illustrations.

Parts with the same effect are illustrated with identical reference numerals in the figures.

DETAILED DESCRIPTION OF THE EXAMPLE EMBODIMENTS

Figure 1:
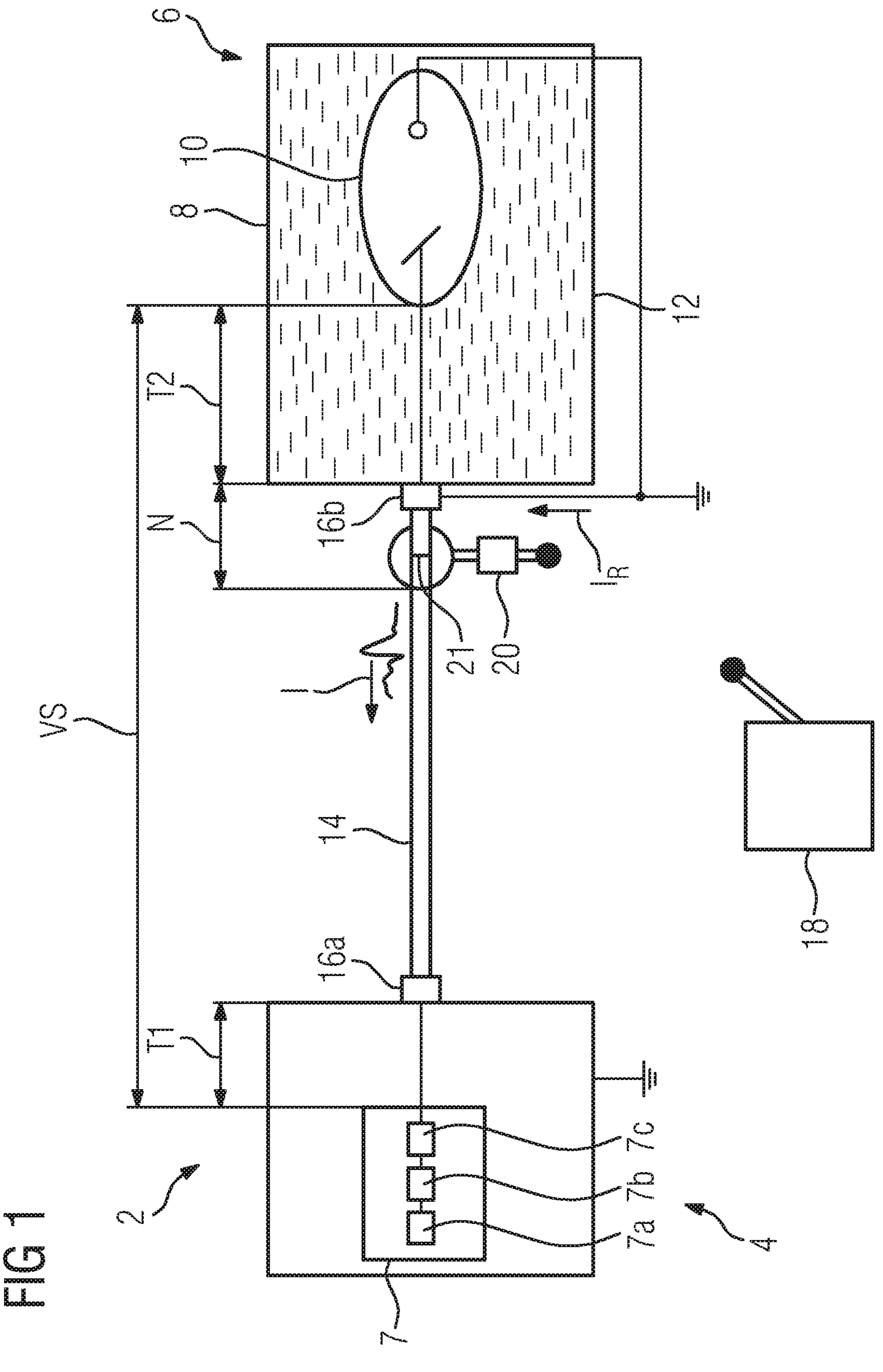
FIG. 1 shows a general construction of X-ray equipment.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term “and/or,” includes any and all combinations of one or more of the associated listed items. The phrase “at least one of” has the same meaning as “and/or”.

Spatially relative terms, such as “beneath,” “below,” “lower,” “under,” “above,” “upper,” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “below,” “beneath,” or “under,” other elements or features would then be oriented “above” the other elements or features. Thus, the example terms “below” and “under” may encompass both an orientation of above and below. The device may be otherwise oriented (rotated 90 degrees or at other orientations) and the spatially relative descriptors used herein interpreted accordingly. In addition, when an element is referred to as being “between” two elements, the element may be the only element between the two elements, or one or more other intervening elements may be present.

Spatial and functional relationships between elements (for example, between modules) are described using various terms, including “connected,” “engaged,” “interfaced,” and “coupled.” Unless explicitly described as being “direct,” when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being “directly” connected, engaged, interfaced, or coupled to another element, there are no intervening elements present. Other words used to describe the relationship between elements should be interpreted in a like fashion (e.g., “between,” versus “directly between,” “adjacent,” versus “directly adjacent,” etc.).

The terminology used herein is for the purpose of describing particular embodiments only and is not intended to be limiting of example embodiments of the invention. As used herein, the singular forms “a,” “an,” and “the,” are intended to include the plural forms as well, unless the context clearly indicates otherwise. As used herein, the terms “and/or” and “at least one of” include any and all combinations of one or more of the associated listed items. It will be further understood that the terms “comprises,” “comprising,” “includes,” and/or “including,” when used herein, specify the presence of stated features, integers, steps, operations, elements, and/or components, but do not preclude the presence or addition of one or more other features, integers, steps, operations, elements, components, and/or groups thereof. As used herein, the term “and/or” includes any and all combinations of one or more of the associated listed items. Expressions such as “at least one of,” when preceding a list of elements, modify the entire list of elements and do not modify the individual elements of the list. Also, the term “exemplary” is intended to refer to an example or illustration.

When an element is referred to as being “on,” “connected to,” “coupled to,” or “adjacent to,” another element, the element may be directly on, connected to, coupled to, or adjacent to, the other element, or one or more other intervening elements may be present. In contrast, when an element is referred to as being “directly on,” “directly connected to,” “directly coupled to,” or “immediately adjacent to,” another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as “processing” or “computing” or “calculating” or “determining” of “displaying” or the like, refer to the action and processes of a computer system, or similar electronic computing device/hardware, that manipulates and transforms data represented as physical, electronic quantities within the computer system’s registers and memories into other data similarly represented as physical quantities within the computer system memories or registers or other such information storage, transmission or display devices.

In this application, including the definitions below, the term ‘module’ or the term ‘controller’ may be replaced with the term ‘circuit.’ The term ‘module’ may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The X-ray equipment has an X-ray emitter and a high-voltage supply. The X-ray emitter has an X-ray tube and the high-voltage supply a high-voltage generator as well as a cable. The cable is preferably a coaxial cable and forms at least part of a connecting passage between the high-voltage generator and the X-ray tube. A connecting passage is taken to mean an electrical connecting line between the output of the high-voltage generator and the input of the X-ray tube.

A high-voltage generator is here in particular taken to mean a high frequency generator for example according to "Bildgebende Systeme for the medizinische Diagnostik" [Imaging Systems for Medical Diagnosis], editor: Heinz Morneburg, 3rd edition, 1995, Publicis MCD Verlag, p. 277 ff, the entire contents of which are hereby incorporated herein by reference, which has an integrated electronic device for detecting high-voltage flashovers at an output or inside the high-voltage generator.

Interference pulses frequently occur with high-voltage flashovers inside the X-ray emitter. Interference pulses are for example flashover currents flowing due to parasitic properties, which occur in particular in the form of common mode currents. The interference pulses typically flow over a plurality of current paths, for example a housing of the X-ray emitter, a current characteristic in the insulating medium or the connecting passage. Currents, which are simultaneously applied at different inputs, here the different current paths, and with the same phase, are designated common mode currents. For example, an interference pulse flowing over the connecting passage has the same phase as the total current at the arc of the high-voltage flashover. The interference pulses are therefore correlated with the high-voltage flashovers.

The detection of high-voltage flashovers is based on the interference pulse being detected and evaluated. Due to the high-voltage flashover, the interference pulse occurs inter alia in the connecting passage. This interference pulse that occurs in the connecting passage is detected during normal operation of the X-ray equipment and then evaluated. The condition of the X-ray emitter is preferably assessed using the evaluated interference pulse.

One embodiment provides that the at least one cable has a forward conductor for leading the X-ray tube current from the high-voltage generator to the X-ray tube, and a return conductor for returning the X-ray tube current from the X-ray tube to the high-voltage generator.

One embodiment provides that the at least one cable is a coaxial cable, that the forward conductor is an inner conductor of the coaxial cable and that the return conductor is an outer conductor of the coaxial cable.

One embodiment provides that the interference pulse is detected on the basis of a difference in the current conveyed in the return conductor from the current conveyed in the forward conductor.

The difference in the current conveyed in the return conductor from the current conveyed in the forward conductor can be caused for example due to a high-voltage flashover. If the current conveyed in the return conductor differs from the current conveyed in the forward conductor, this can result in a differential current in the at least one cable. The resulting differential current can induce a voltage in a coil, in particular in a Rogowski coil, through which the at least one cable is led. The interference pulse can in particular be detected on the basis of the voltage, which is induced by the resulting differential current in the coil.

This evaluation is based on the advantage that a physical variable is detected, which directly correlates with the high-voltage flashover.

It has proven to be advantageous to detect the interference pulse locally at the connecting passage. Locally is here taken to mean a measuring position along the connecting passage.

The interference pulse is preferably detected along cable. Detection along the cable is based on the consideration that a significant portion of the high-voltage flashover flows off via the cable between the high-voltage generator and the X-ray emitter. Furthermore, detection at a local measuring position along the cable is advantageous in that easy access to the cable, and therefore simple and inexpensive measuring effort, is ensured. Due to detection of the interference pulse on functionally installed X-ray equipment, this embodiment is advantageous in particular in that the interference pulse is detected during normal operation of the X-ray equipment. Alternatively, the interference pulse is detected inside the X-ray emitter.

In a supplementary development a measuring device designed for detecting high-voltage flashovers has a measuring element for detecting the interference pulses. This is preferably a measuring element for detecting an electrical current or for detecting a physical variable, from which an electrical current is derived.

A current characteristic resulting from a high-voltage flashover can usually no longer be authentically detected in a cable after a covered section of for example about one meter. The reason for this is the damping of the cable. Due to this damping, a vicinity of the X-ray emitter is defined over the last half, in particular the last quarter of the cable, viewed in the emitter direction. For example, the vicinity is defined by the last 30 cm, in particular the last 10 cm of the cable, before the X-ray emitter adjoins the cable. The interference pulse is preferably detected in the vicinity. This has the advantage that the interference pulse is detected virtually without damping.

High-voltage flashovers through the insulating medium typically run in a time interval having values of, for example, a few microseconds. High-voltage flashovers in a vacuum, however, frequently have transients, which correspond for example to a value in a range of 1 kV to 30 kV per nanosecond. The duration of high-voltage flashovers, which for example flashover in the insulating medium, can sometimes last a few microseconds, for example times having a value in the range of 5 μs to 10 μs. Owing to this, "fast" metrology is necessary for detection of the interference pulse, and this detects signals having a signal duration with values in the range of preferably 2 ns to 10 μs and in particular with values in the range of 10 ns to 100 ns.

Different categories of flashover are expediently inferred owing to the evaluation of the detected interference pulse. Categories of flashover are here taken to mean types of flashover or the location in which the flashover strikes. For example, the high-voltage flashovers are differentiated into

- flashovers in the vacuum of the X-ray tube,
- flashovers in a solid of the X-ray emitter and
- partial discharges with partially defective insulated sections inside the insulating medium.

Flashovers in the vacuum of the X-ray tube are largely self-repairing, in other words they do not constitute a specific risk to the X-ray tube or the X-ray emitter. They are brought about by a defective vacuum and cannot be avoided since residual air remains in the X-ray tube during manufacture.

Flashovers in a solid of the X-ray emitter, for example in a casting compound or the insulating medium of the X-ray emitter, and in a cable or insulating medium of the high-voltage generator usually culminate in a defect in the emitter. Firstly, a high-voltage flashover changes the chemical composition of the insulating oil and therefore reduces the insulating effect or even disables it altogether. Secondly, the high albeit short thermal load of a high-voltage flashover leads to damage to or destruction of the housing of an affected component or an affected part and therefore sometimes to damage to or destruction of the components or part per se.

Partial discharges present a special feature. Partial discharges result due to slight differences in the dielectric strength of a material. If for example small, low-energy partial discharges occur on the housing of the X-ray emitter, then the dielectric strength at these partial discharge locations have a lower value than at other locations of the housing. Alternatively, partial discharges should be interpreted as what are referred to as pre-discharges before the actual high-voltage flashover. Here, either the applied voltage is insufficient for a flashover to occur, or the dielectric strength is just high enough to prevent a high-voltage flashover. Both properties of partial discharges can be used for early recognition of high-voltage flashovers and therefore damage incurred by the X-ray emitter.

The respectively different characteristic of the flashover voltage, and of the flashover current associated therewith, is used to enable a distinction of the types of flashover relevant to the method. By comparing the detected characteristic of the interference pulse with, for example, reference characteristics stored in a database, a specific category of flashover is inferred.

The advantage of the categorization of the high-voltage flashovers that occur, and the assessment of the emitter condition associated therewith lies in timely procurement of spare parts, if required. In particular, detection of partial discharges ensures early detection of damage that occurs to the X-ray emitter, whereby firstly determination of the location of the defective component can be isolated and secondly the quality of the fault can be inferred. Using this information, a timely decision can be made in respect of the follow-up measures, for example whether the defective component can be replaced or repaired. A system downtime and arising costs are therefore reduced.

In a preferred development the interference pulse is evaluated with the aid of a remote diagnosis. This development has the advantage that the evaluation of the defected measured variable is independent of location. Specifically, the diagnosis is made by the equipment manufacturer for example by way of remote access.

At least one embodiment is also directed to X-ray equipment.

In at least one embodiment, the X-ray equipment has an X-ray emitter and a high-voltage supply. The X-ray emitter also has an X-ray tube and the high-voltage supply a high-voltage generator as well as a cable. The cable is at least part of a connecting passage between the high-voltage generator and the X-ray tube. The connecting passage is taken to mean a line connection between the output of the high-voltage generator and the input of the X-ray tube. The connecting passage therefore encloses a first sub-line between the output of the high-voltage generator and the start of the cable as well as a second sub-line between the input of the X-ray emitter and the input of the X-ray tube.

The advantages stated in respect of the method and example embodiments should logically be transferred to the measuring assembly and vice versa. Preferred developments of the X-ray equipment are provided, moreover, in the claims.

In at least one embodiment, the X-ray equipment also has a measuring device, which is designed for detecting high-voltage flashovers during operation. For this the measuring device has a measuring element. In an expedient embodiment the measuring device detects the interference pulse along the cable. The measuring element is positioned for this purpose at a measuring position locally along the cable.

One advantage of this embodiment lies in the straightforward detection of the interference pulse. This positioning of the measuring element also ensures firstly minimal installation effort and secondly low assembly costs.

A further advantage of this is the retrofitting capability of the measuring device for X-ray equipment that has already been installed and is being operated.

According to one expedient development, the measuring element is arranged in a vicinity of the X-ray emitter.

Alternatively, the measuring element is positioned along the second section for detecting the measured variables, for example by assembly of the measuring element inside the X-ray emitter.

The measuring element preferably has a coil. Due to the simple construction and the high current-carrying capacity, coils are particularly suitable for detecting currents flowing in cables or conductors.

In an alternative embodiment the measuring element has a “shunt” or a transformer.

The advantage of this preferred embodiment of the measuring element is simple and inexpensive manufacture and in particular the detection of steep rises in current.

In a supplementary development the coil is designed as a Rogowski coil, or the measured variables are detected according to the Rogowski principle.

A Rogowski coil is a toroidal air coil, which is preferably implemented as an open circular coil and is uniformly wound around a preferably non-conductive and non-ferromagnetic material. The Rogowski principle uses the alternating voltage induced in concentrically arranged circular coils by alternating currents flowing in a conductor in order to infer the current flowing through the conductor. The alternating current flowing through the conductor generates a magnetic field, which induces an alternating voltage in the coil. By way of equation (1)

$$u=M\cdot t'(t) \qquad (1)$$

a variable proportional to the conductor current can then be inferred by integration of the voltage over the desired time interval (in which the alternating current flowed), where u=induced voltage, M=mutual inductance of the coil and t'(t)=change in current during the time interval. The integral is formed for example by an integrator. Taking this as a starting point, the measuring device has further elements, including an integrator.

Use of a coil, specifically a Rogowski coil, firstly has the advantage of a more robust construction compared to other current measuring method, and secondly, simple and inexpensive assembly.

According to an expedient development, the Rogowski coil preferably has a differential construction. Here two identical but opposed coils are nested in each other. Due to Ampère’s right hand screw rule, the electromagnetic fields inside the coil are cancelled out and therefore improve the interference immunity of the coil with respect to external interference fields. Due to the differential construction, the coil detects only changes in the current.

The advantage of this development is that the coil is optimized as a measuring element and is more interference resistant than a non-differential construction, resulting in accurate detection of the measured variable.

FIG. 1 illustrates a general construction of X-ray equipment 2. The X-ray equipment 2 has a high-voltage supply 4 and an X-ray emitter 6. The high-voltage supply 4 typically has a high-voltage generator 7, which is preferably designed as a high frequency generator. The high-voltage generator has an inverter 7*a*, preferably a resonant circuit inverter for generating a high-frequency alternating voltage having values in the range of preferably a few kHz. A high-voltage transformer 7*b* adjoins the inverter 7*a*, and rectifies the high-frequency alternating voltage with which it is supplied. A voltmeter 7*c* arranged at a voltage output of the high-voltage generator measures the rectified alternating voltage, hereinafter also called output voltage, and therefore serves as a surge protector.

The X-ray emitter 6 firstly has an X-ray tube 10 surrounded by an insulating medium 8, preferably an insulating oil, and secondly an emitter housing 12. With a single-pole design of the X-ray tube, insulation is frequently implemented by way of a casting compound. Here a forward conductor of the X-ray tube 10 is introduced into the casting compound from an input of the X-ray emitter 6 as far as an input of the X-ray tube 10. An insulating oil can be dispensed with in this design. For example, X-ray emitters 6 of this kind have water as the insulating medium 8, by which the X-ray tube 10 is surrounded.

The high-voltage generator 8 and the X-ray tube 10 are electrically connected together by a connecting passage VS.

The connecting passage VS is divided into a first sub-line T1, a cable 14 and a second sub-line T2. Whereas the first sub-line T1 electrically connects the output of the high-voltage generator 8 to the start of the cable 14, the second sub-line T2 connects the end of the cable 14 to the input of the X-ray tube 10. The cable 14 electrically connects the high-voltage supply 4 and the X-ray emitter 6 together by way of plug connections 16*a*,16*b* and is therefore used for the current and voltage supply of the X-ray emitter 6. The cable 14 is preferably a coaxial cable, in which the X-ray tube current IR flows via an inner conductor to the X-ray tube 10 and via a grounded outer conductor back to the high-voltage generator 7. The cable 14 is, moreover, the only part of the connecting passage VS which is preferably routed so as to be accessible from outside.

In addition, the X-ray equipment 2 has a measuring device 18. The measuring device 18 has a measuring element 20 for detecting high-voltage flashovers.

High-voltage flashovers frequently occur during operation of the X-ray equipment 2 and cause flashover currents, or also called interference pulses I, which spread preferably over a plurality of current paths. Current paths of this kind are for example the emitter housing 12, the insulating oil 8 or the connecting passage VS.

To detect the interference pulses I, the measuring element 20 is arranged at a measuring position 21 along the connecting passage VS. The measuring element 20 is preferably positioned in a vicinity N along the cable 14. The vicinity N defines the last third to the last quarter of the cable, preferably the last 30 cm of the cable and in particular the last 10 cm of the cable before the plug connection 16*b*, which connects the cable 14 to the X-ray emitter 6. This positioning is based on the consideration that due to the defined damping of the cable 14, a more remote detection site is defective since the interference pulse I is either heavily damped or no longer detected. Alternatively, the measuring element 20 is positioned along the second sub-line T2, for example by incorporation of the measuring element 20 in the X-ray emitter 6 during manufacture thereof. One particular advantage is detection of the interference pulse I during operation of the X-ray equipment 2.

The measuring device 18 and the measuring element 20 have a connection, so signal or data are exchanged among themselves. The connection is preferably implemented by way of a data line, in particular a remote connection. The interference pulses I detected by the measuring element 20 are evaluated independently of location by way of the remote connection. The evaluation occurs for example in the form of a remote diagnosis by the equipment manufacturer.

Figure 2:
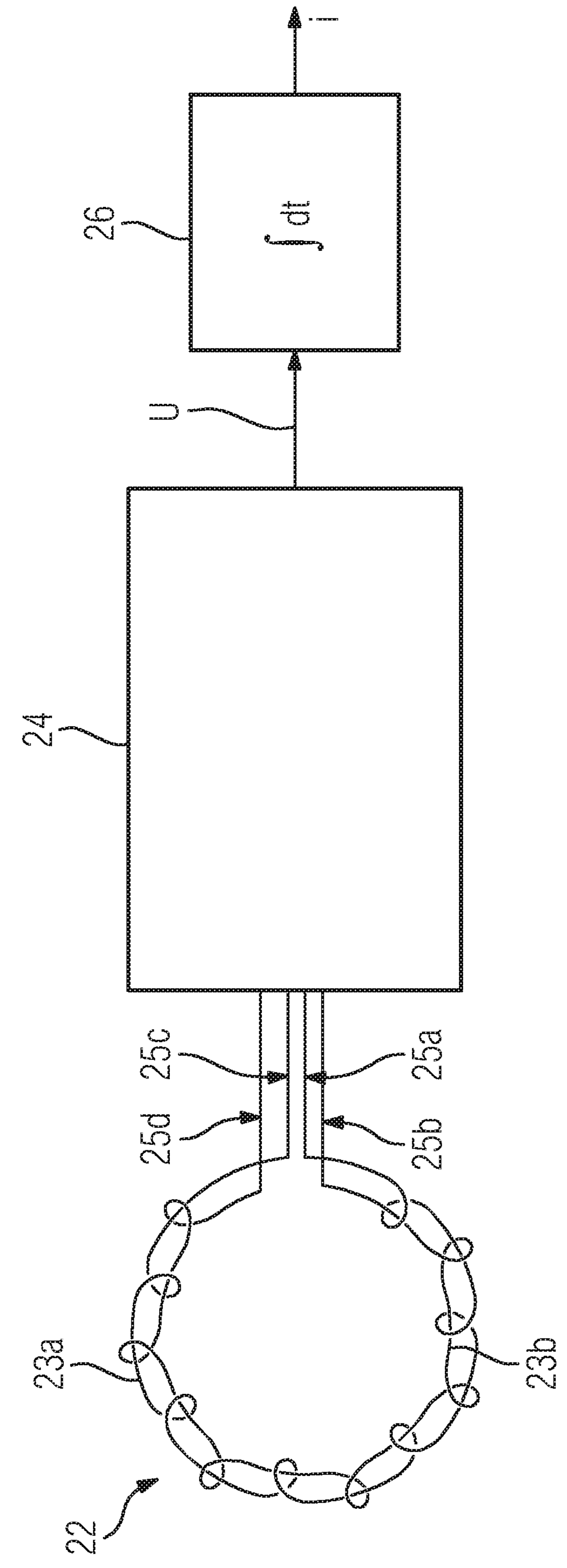
FIG. 2 shows a simplified block diagram of the measuring device.

Since the interference pulse I to be detected is a variable correlated with the high-voltage flashover, and in particular a flashover current, the measuring element 20 preferably has a coil 22. Due to the electromagnetic induction, coils are particularly suitable for detecting electrical currents, in particular steep current transients. FIG. 2 shows a grossly simplified illustration of a block diagram of the measuring device 18 and a measuring element 20 of this kind.

The measuring device also has a differential amplifier 24 and an integrator 26. The coil 22 is designed in particular as a Rogowski coil. The Rogowski coil is a coil that is completely wound around an annular, non-conductive and non-ferromagnetic solid, also called an air coil. According to an expedient embodiment, the Rogowski coil has an open arc, which is implemented by a magnetically neutral return of a second coil connection to the other end. This means that the two connections of the Rogowski coil are arranged on one side of the coil. The coil 22 consequently has a geometry of a round hook.

The advantage of this embodiment is that the cable 14 is guided with minimal effort through the circular opening into the interior of the coil 22 and therefore the interference pulse I that occurs in the cable 14 is detected. Furthermore, minimal-effort and inexpensive retrofitting of the measuring device 20 in X-ray equipment 2 that has already been installed is ensured.

The coil 22 preferably has a differential construction. The differential construction leads to increased electrical interference resistance of the coil 22 compared to a simple construction. With a differential construction of a coil, a first coil section 23*a* and an opposing second coil section 23*b* are preferably nested in each other, so the electromagnetic fields inside the coil cancel each other out. The reason for this is the opposing field profile of the electromagnetic fields each generated by the two coils. The inside of the coil 22 is therefore virtually field-free and the coil detects only changes in the field, as are produced for example with a current pulse I that occurs inside the line to be measured.

The two coils 23*a*,23*b* are arranged for example on a printed circuit board. The coils 23*a*,23*b* each have a forward conductor 25*a*,25*b* and a return conductor 25*c*,25*d* respectively. The forward conductors 25*a*,25*b* and the return conductors 25*c*,25*d* are each arranged intertwined with each other. In other words, the two forward conductors s25*a*,25*b* are twisted around each other and the two return conductors 25*c*,25*d* are twisted around each other as well as designed so as to be jointly shielded. This design enables firstly an arrangement of the forward conductors 25*a*,25*b* and the return conductors 25*c*,25*d* on the same printed circuit board and secondly, the forward conductors 25*a*,25*b* and the return conductors 25*c*,25*d* are shielded from the capacitive loads that occur in their surroundings, for example due to an anode motor or an anode heater of the X-ray equipment.

The interference pulse I that suddenly occurs in the cable 14 leads to an increase in the electromagnetic field, which the coil 22 is exposed to for the duration of the pulse. The electromagnetic field induces a voltage in the two coil sections 23*a,b*. The differential amplifier 24 subtracts the two output signals of the coil sections 23*a,b*. From this the induced voltage U results as a difference in the two output signals. The greater the interference pulse I, the higher the field change and therefore the difference in the output signals, consequently the higher the induced voltage is. Since a voltage is detected by way of the coil 22, but the interference pulse I to be detected is an electrical current, an integrator 26 preferably adjoins the differential amplifier 24.

A variable proportional to the interference pulse I, and therewith the flashover current, is calculated by integration of the induced voltage (cf. equation (1) in this regard) over the pulse duration of the interference pulse I. After integration by the integrator 26, the interference pulse I is output to the measuring device 18 for further evaluation.

Figure 3:
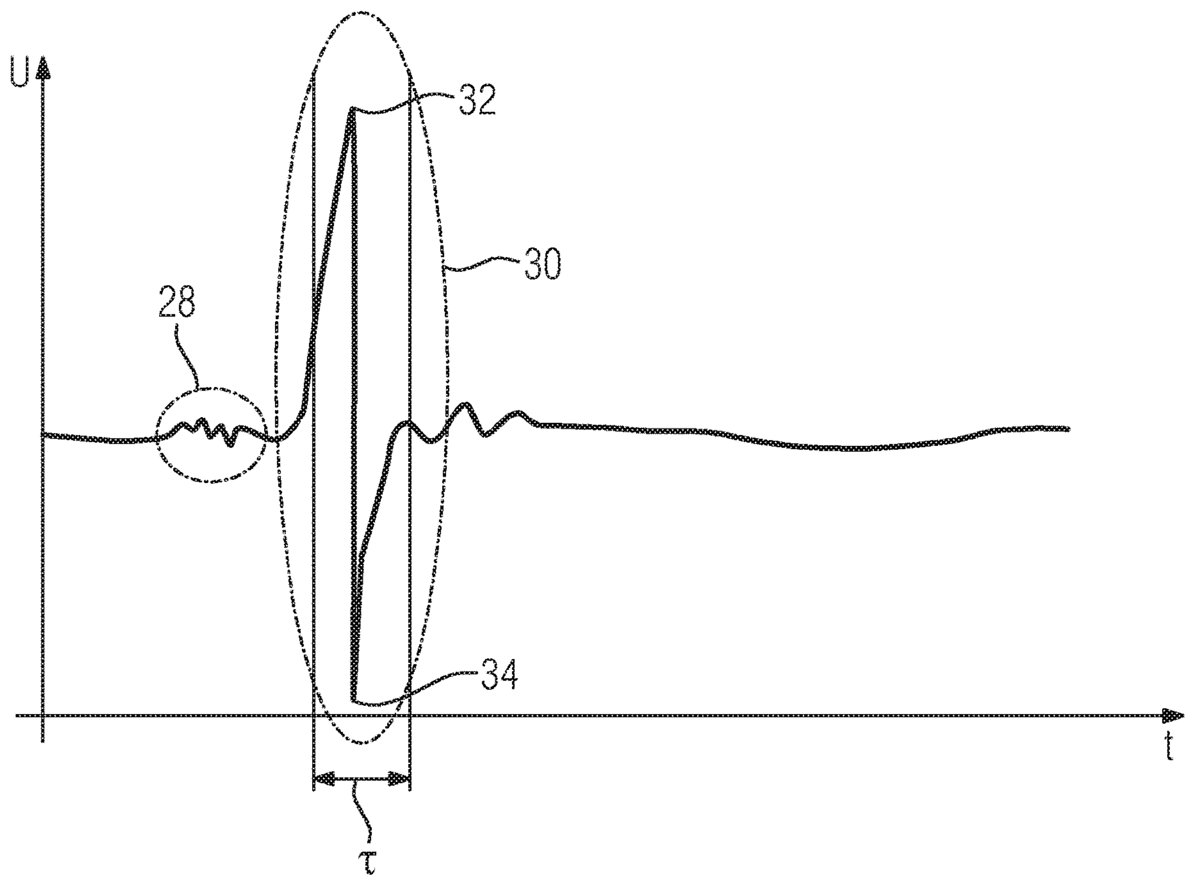
FIG. 3 shows an outlined characteristic of a high-voltage flashover over time.

FIG. 3 shows an outlined characteristic of the flashover voltage just before, during and after a high-voltage flashover as a function of time. The voltage characteristic is divided into pre-discharges 28 and the actual high-voltage flashover 30. This is correlated with the interference pulse I. The pre-discharges 28 have a low voltage amplitude compared to the high-voltage flashover 30. They are basically produced by differences in dielectric strength. The dielectric strength is lower at some locations in a medium than at other locations, so the applied voltage is already high enough to generate small discharges.

The time in which a high-voltage flashover discharges is conventionally called the pulse duration $\tau$. High-voltage flashovers inside the X-ray emitter 6 of the X-ray equipment 2 typically have a pulse duration $\tau$ with values in the range of 2 ns to 10 μs, in particular a pulse duration $\tau$ with values in the range between 10 ns and 100 ns. Within the pulse duration $\tau$ the voltage increases steeply and after reaching a maximum value 32 drops to a minimum value 34 before the voltage levels off again at the voltage value which it had before the discharge. Due to the short pulse duration in the nanosecond range, the measuring device 18 preferably has fast metrology.

Detection of the interference pulses I also enables a prophylactic assessment of the condition of the X-ray emitter 6. For example, due to the pre-discharges 28, a defective component is inferred as early as before a high-voltage flashover 30 and this component is replaced in good time. This prevents extensive damage due to a high-voltage flashover 30 and a long system downtime associated therewith. The high-voltage flashover 30 is also compared with existing reference characteristics of high-voltage flashovers 30. Classification of the high-voltage flashover 30 that has occurred into for example:

a flashover in the vacuum of the X-ray tube,
a flashover in a solid of the X-ray emitter or
partial discharges before a flashover is then enabled on the basis of the comparison. These different flashover classifications lead to different detects inside the X-ray equipment 2. Detailed damage analysis of the defective component is made on the basis of the classification of the high-voltage flashover 30, and this leads to an optimized procurement process of a replacement part.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for detecting in X-ray equipment including an X-ray emitter and a high-voltage supply, the X-ray emitter including an X-ray tube and the high-voltage supply including a high-voltage generator and at least one cable, the at least one cable being at least part of a connecting passage between the high-voltage generator and the X-ray tube, the method comprising:

detecting an interference pulse via a measuring element having a coil with a first coil section and a second coil section nested in each other to form a differential construction, during normal operation of the X-ray equipment, occurring due to a high-voltage flashover in the connecting passage; and determining a category of a flashover from among a plurality of different flashover categories by evaluating the detected interference pulse.

2. The method of claim 1, wherein the detecting includes detecting the interference pulse at a measuring position located along the connecting passage.

3. The method of claim 2, wherein the evaluating includes evaluating a current flowing in the connecting passage due to the high-voltage flashover.

4. The method of claim 2, wherein the detecting includes detecting the interference pulse in a vicinity of the X-ray emitter.

5. The method of claim 2, wherein the detecting and evaluating includes detecting and evaluating interference pulses including a pulse duration with values in a range of 1 ns to 10 ms.

6. The method of claim 2, further comprising:

making an assessment of a condition of the X-ray equipment or components of the X-ray equipment, using an evaluated interference pulse.

7. The method of claim 2, wherein the high-voltage generator includes a voltmeter, additionally used for detection of high-voltage flashovers.

8. The method of claim 1, wherein the evaluating includes evaluating a current flowing in the connecting passage due to the high-voltage flashover.

9. The method of claim 3, wherein the detecting includes detecting the interference pulse at a measuring position located along the cable.

10. The method of claim 8, wherein the detecting and evaluating includes detecting and evaluating interference pulses including a pulse duration with values in a range of 1 ns to 10 ms.

11. The method of claim 3, wherein the high-voltage generator includes a voltmeter, additionally used for detection of high-voltage flashovers.

12. The method of claim 1, wherein the detecting includes detecting the interference pulse at a measuring position located along the cable.

13. The method of claim 12, wherein the detecting includes detecting the interference pulse in a vicinity of the X-ray emitter.

14. The method of claim 1, wherein the detecting includes detecting the interference pulse in a vicinity of the X-ray emitter.

15. The method of claim 1, wherein the detecting and evaluating includes detecting and evaluating interference pulses including a pulse duration with values in a range of 1 ns to 10 ms.

16. The method of claim 1, further comprising:

making an assessment of a condition of the X-ray equipment or components of the X-ray equipment, based on the evaluated interference pulse.

17. The method of claim 1, wherein the evaluating of the interference pulse includes evaluating of the interference pulse with aid of a remote diagnosis.

18. The method of claim 1, wherein the high-voltage generator includes a voltmeter, additionally used for detection of high-voltage flashovers.

19. The method of claim 1, wherein the plurality of different flashover categories include flashovers in a vacuum of the X-ray tube,
flashovers in an insulating material, and
partial discharges.

20. X-ray equipment, comprising:

an X-ray emitter including an X-ray tube; and a high-voltage supply including a high-voltage generator and a cable, the cable being at least part of a connecting passage including a coil between the high-voltage generator and the X-ray tube; and a measuring device connected to a measuring element having a coil with a first coil section and a second coil section nested in each other to form a differential construction and configured to detect, during operation, an interference pulse occurring due to a high-voltage flashover in the connecting passage, wherein the cable passes through a circular opening in the coil.

21. The X-ray equipment of claim 20, wherein the measuring element is designed to detect the interference pulse at a measuring position along the cable.

22. The X-ray equipment of claim 21, wherein the measuring element is positioned in a vicinity of the X-ray emitter.

23. The X-ray equipment of claim 20, wherein the measuring element is positioned in a vicinity of the X-ray emitter.

24. The X-ray equipment of claim 20, wherein the coil is designed as a Rogowski coil.

25. The X-ray equipment of claim 20, wherein the coil is designed as a Rogowski coil.

* * * * *